United States Patent Office 3,196,132
Patented July 20, 1965

3,196,132
AROMATIC DIOL CHAIN-EXTENDED
POLYESTER URETHANES
Irving Rosen, Painesville, Ohio, assignor to Diamond Alkali Company, Cleveland, Ohio, a corporation of Delaware
No Drawing. Filed Apr. 20, 1961, Ser. No. 104,259
8 Claims. (Cl. 260—75)

This invention relates to new compositions of matter and in particular to solid, cured polyurethane elastomers chain-extended with compounds of the formula

HO—R—OH wherein R is selected from the group consisting of

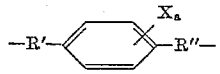

and

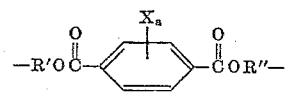

R' and R" are selected from the group consisting of divalent alkylene and aralkylene radicals; X is halogen; and $a$ is an integer from 0 to 4.

Examples of specific chain-extending agents which may be used in elastomers of this invention are p-xylene-a,a'-diol; 2,5-dichloro-p-xylene-a,a'-diol; 2-chloro-p-xylene-a,a'-diol; and bis-(2-hydroxyethyl) terephthalate.

In general, compounds of this invention are prepared from a hydroxyl-ended polyester (e.g., a glycol-adipate polyester) of molecular weight 2000 to 3000, a diisocyanate (e.g., p,p'-diphenylmethane diisocyanate), and a diol or diamine chain-extending agent. The molar proportions of the reactants and the conditions under which the polymerization is carried out are largely empirical, and relatively small deviations from these proportions and conditions may result in profound changes in the physical properties of the elastomer produced. The optimum conditions may vary with the reactants, and so it should be understood that the following general procedure is illustrative and is in no way intended to restrict the invention.

The optimum molar proportions of reactants for the preparation of elastomers of this invention have been found to be 1.00:3.20:2.02 of polyester, diisocyanate and chain-extender, respectively. The allowed variation in these ratios is approximately 3%. Other important factors are the water content of the chain-extender, which should be not greater than .3%, and alkaninity of the chain-extender (the pH of a 1% aqueous solution should not be greater than 7.00).

In general, polyurethane elastomers of the present invention may be prepared by the following procedure: A resin kettle fitted with a stirrer, thermometer, a gas inlet capillary and a vacuum connection, is charged with 145 to 155 parts by weight of a hydroxyl-ended polyester (e.g. Mobay Multron R-14, a glycol-adipate polyester of molecular weight 2000–3000). Citric acid monohydrate, 0.01–0.05 part by weight, is added to lower the pH. The kettle is flushed with nitrogen and evacuated to a pressure of 10 to 50 mm. of mercury, and the contents are heated to 100–200° C. for one to five hours, in order to remove any water which may be present. The vacuum is released with nitrogen and 58 to 62 parts by weight of molten diisocyanate is added in one increment, the temperature of the reaction vessel being maintained at approximately 100° to 180° C. Dry nitrogen is bubbled through the molten mass for approximately five minutes, after which the pressure is again reduced to 10 to 50 mm. of mercury. The temperature of the reaction mixture is lowered to 124–131° C. over 25 minutes (this temperature varies with the chain-extending agent used), and at the end of this time the vacuum is again released with nitrogen and 15–40 parts by weight of the chain-extending agent is added in one increment. The reaction mixture is stirred for 20 to 60 seconds and then poured onto a preheated mold which has been treated with a mold releasing agent, e.g., carnauba wax, and covered with cellophane. The resin remaining in the kettle is observed until it develops a slight haze or turbidity and becomes gelatinous. The elapsed time between the addition of the chain-extender and the appearance of this turbidity is designated as the pouring time. The lower practical limit of the pouring time is 45 seconds.

The polymer in the mold is covered with cellophane and molded for ½ to 5 hours, preferably about one hour, at 100–120° C. under about 2000 p.s.i. pressure. It is then removed from the mold and given a post-cure of 20 to 30 hours at 100–120° C. in a circulating air oven.

The elastomer produced by the foregoing method is given tests for tensile strength, 300% modulus, percent elongation (ASTM procedure D412-51T), crescent tear strength (ASTM procedure D624-54, die A) and Shore A hardness (ASTM procedure D676-55T).

A study of the effect of chain-extender purity on the physical properties of the resulting polymer has shown that there is no apparent correlation between these physical properties and the melting point or hydroxyl number of the chain-extender. Water content of the chain-extender also has no noticeable effect as long as it is kept below .3%; higher percentages result in foaming of the reaction mixture and poor physical properties in the elastomer. The alkalinity of the chain-extender is very critical; presence of an alkaline material in sufficient quantity to raise the pH of a 1% aqueous solution of the diol above 7.00 will catalyze the curing of the elastomer to the extent that it will crumble when molded rather than flow.

The advantage of the use of p-xylene-a,a'-diol as a chain-extender as compared with other materials in general use [e.g., bis(hydroxyethoxy)hydroquinone] is in its lower molecular weight. As a result, less of the diol (about 9.1% by weight) is required for a given weight of polyurethane than is true with other materials [e.g., 12.5% for bis(hydroxyethoxy)hydroquinone]. As a result, there is a marked saving in cost. Other chain-extenders of this invention may be used if a modification of properties of the elastomer is desired.

The following examples are given in order that those skilled in the art may more completely understand the present invention and the preferred methods by which the same may be carried into effect.

*Example 1*

A resin kettle is equipped with a stirrer, thermometer, gas inlet capillary and vacuum connection. The kettle is charged with 150 g. (0.075 mole) of Mobay Multron R-14 polyester and 0.021 g. of citric acid monohydrate. The polyester and citric acid are heated in the resin kettle for two hours at 150° C., with stirring, under lamp grade nitrogen atmosphere at an absolute pressure of 30 mm. of mercury. The temperature is then lowered to 145° C. and the vacuum is released with nitrogen. Sixty grams (0.24 mole) of freshly filtered molten (55° C.) p,p'-diphenylmethane diisocyanate is added in one increment. The diisocyanate and polyester are allowed to react for about five minutes at atmospheric pressure with a slow stream of nitrogen bubbling through the reaction mass; then the pressure is again reduced to 30 mm. of mercury. Heating of the resin kettle is reduced at this point so that the temperature drops to 124–131° C. by the end of the 25 minute reaction between polyester and diisocyanate.

Exactly 25 minutes after the addition of diisocyanate, the vacuum is released with nitrogen, the stirring rate is increased and 20.9 g. (0.15 mole) of molten (125° C.) p-xylene-a,a'-diol is added in one increment. Thirty seconds after adding the chain-extender, the resin is poured onto the preheated (110° C.), cellophane covered mold which has been treated with carnauba wax as a mold release agent.

The cast sheets are covered with cellophane and immediately molded for one hour at 110° C. under 2000 p.s.i. pressure. Following removal from the mold, the sheets are given a post-cure of 23 hours at 110° C. in a circulating air oven.

Results of physical tests on the polymer prepared by this method are given in Table I.

*Example 2*

The procedure of Example 1 is followed except that 31 g. (0.15 mole) of 2,5-dichloro-p-xylene-a,a'-diol is used as the chain-extending agent. Physical properties of the resulting elastomer are given in Table I.

*Example 3*

The procedure of Example 1 is followed, except that 26.8 g. (0.15 mole) of 2-chloro-p-xylene-a,a'-diol is used as a chain-extending agent. Physical properties of the product are given in Table I.

*Example 4*

Using the procedure of Example 1, an elastomer is prepared using 38.1 g. (0.15 mole) of bis-(2-hydroxyethyl)terephthalate as a chain-extender. Physical properties of this elastomer are given in Table I.

| Chain-extender | Tensile strength, p.s.i. | 300% modulus, p.s.i. | Percent elongation | Tear strength, lbs./in. | Shore A hardness |
|---|---|---|---|---|---|
| p-Xylene-a,a'-diol [1] | 3,767 | 2,287 | 466 | 855 | 98 |
| 2,5-dichloro-p-xylene-a,a'-diol | 2,450 | 1,460 | 500 | | 75 |
| 2-chloro-p-xylene-a,a'-diol | 2,970 | 1,460 | 510 | | 65 |
| Bis-(2-hydroxyethyl) terephthalate | 3,320 | 1,980 | 600 | | 88 |

[1] Values given are mean values from 31 runs.

It is to be understood that although the invention has been described with specific reference to particular embodiments thereof, it is not to be so limited, since changes and alterations therein may be made which are within the full intended scope of this invention as defined by the appended claims.

What is claimed is:

1. A process for the preparation of a solid, cured polyurethane elastomer comprising heating a mixture of 145–155 parts by weight of a hydroxyl-ended polyester and 0.01–0.05 parts by weight of citric acid monohydrate to 100–200° C. at a pressure of 10–50 mm. of mercury; adding 58–62 parts by weight of p,p'-diphenylmethane diisocyanate; lowering the temperature to 124–131° C., maintaining the temperature and adding 15–40 parts by weight of a chain-extender of the formula: HO—R—OH, wherein R is selected from the group consisting of

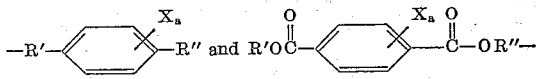

—R' and R" are alkylene radicals, X is chlorine, and $a$ is an integer from 0 to 2; molding at 100–120° C. under about 2000 p.s.i. pressure; and post-curing in an oven at 100–120° C.

2. The process of claim 1 wherein the polyester is a hydroxyl-ended glycol adipate of molecular weight 2000–3000.

3. The process of claim 1 wherein the chain-extender is p-xylene-a,a'-diol.

4. The process of claim 1 wherein the chain-extender is 2,5-dichloro-p-xylene-a,a'-diol.

5. The process of claim 1 wherein the chain-extender is 2-chloro-p-xylene-a,a'-diol.

6. The process of claim 1 wherein the chain-extender is bis(2-hydroxyethyl)terephthalate.

7. Solid cured polyurethane elastomer prepared by the process of claim 1.

8. A solid cured polyurethane elastomer prepared by the process of claim 3.

References Cited by the Examiner

UNITED STATES PATENTS

| | | | |
|---|---|---|---|
| 2,861,972 | 11/58 | Müller | 260—75 |
| 2,917,486 | 12/59 | Nelson | 260—75 |
| 2,929,800 | 3/60 | Hill | 260—75 |
| 2,967,854 | 1/61 | Bungs | 260—77.5 |
| 3,012,992 | 12/61 | Pigott | 260—75 |

LEON J. BERCOVITZ, *Primary Examiner.*

HAROLD N. BURSTEIN, DONALD E. CZAJA,
*Examiners.*